UNITED STATES PATENT OFFICE.

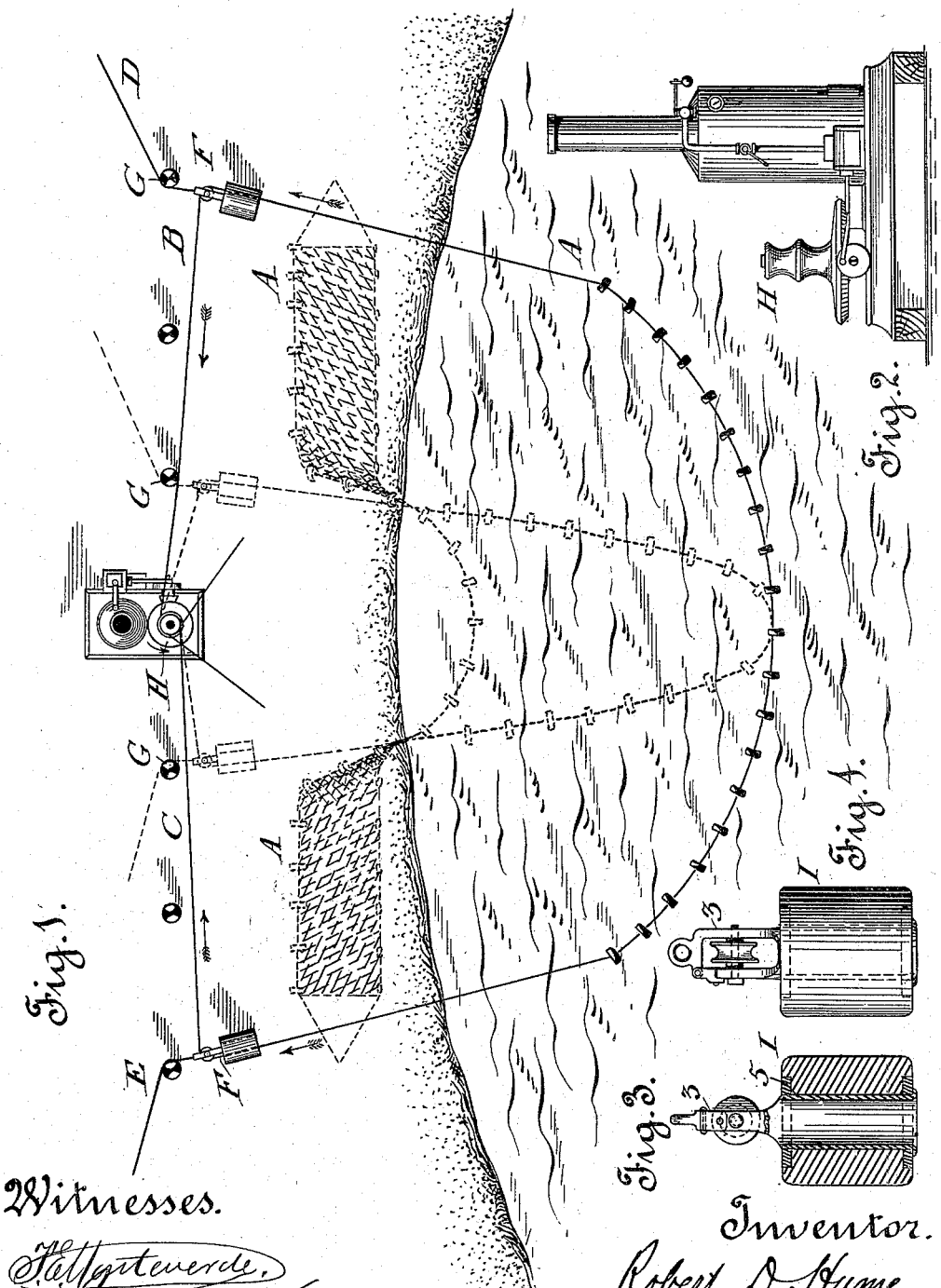

ROBERT D. HUME, OF GOLD BEACH, OREGON.

HAULING SEINES.

SPECIFICATION forming part of Letters Patent No. 535,246, dated March 5, 1895.

Application filed October 5, 1894. Serial No. 525,019. (No model.)

*To all whom it may concern:*

Be it known that I, ROBERT D. HUME, a citizen of the United States, residing at Gold Beach, in the county of Curry and State of Oregon, have invented certain new and useful Improvements in Hauling Seines; and I do hereby declare that the following is a full, clear, and exact description thereof.

My invention relates to an improved method of and apparatus for drawing seines or fishing nets, particularly adapted to be used in places where fishing operations are carried on upon a large scale. The object of my invention is to apply power to the hauling of such seines and thereby materially reduce the number of hands commonly and necessarily employed. Such seines are frequently of great size; and the weight of the fish and the resistance of the water require the employment of a large number of men to handle the hauling lines and the leading lines. I employ an engine of any suitable kind, such as a steam or gas engine, and use it in connection with devices for hauling the seine, and for controlling and changing the direction of the pull while the net is being hauled in, so as to contract the net or seine at either or both ends. As the net is thus contracted and hauled ashore, it is spread upon the beach leaving a comparatively small bight which holds the great mass of fish.

My invention is fully shown in the accompanying drawings, in connection with which the following detailed description should be read.

In the drawings: Figure 1, is a plan view supposed to represent a shore or beach, an engine in position on the beach, and a seine in the act of being hauled in. Fig. 2, is an elevation of the engine and its double capstan. Fig. 3, is a sectional view of one of the snatch blocks for the hauling line and leading line. Fig. 4, is an elevation of the same.

A, represents the seine which is of ordinary construction provided with hauling lines B, and C, and with leading lines D, and E. It also has the usual floats and sinkers at the upper and lower edges respectively. The full lines in Fig. 1, show the net at the time when the hauling is about to commence. The hauling lines are carried through snatch blocks F, and the leading lines are secured to said blocks. A peculiar construction of these blocks will be adverted to hereinafter. Fixed in the shore at both sides of the engine are posts G, any number of which may be provided according to the size of the seine. The leading lines D, and E, secured to the blocks, are given one or two turns around the end post, and their ends are held by one or more men so that they can be retained on the post or slackened at will. The hauling lines pass over sheaves in the snatch blocks, and extend to the engine where they are given turns in reverse direction around the double capstan H, the latter being connected by any suitable gearing to the engine shaft. Both drums of the capstan are fixed upon the same shaft, and, as the ropes are reversely turned, Fig. 1, the movement of the capstan will give a simultaneous pull to both lines and hence to both ends of the same. At the same time, the use of two separate drums prevents the two hauling lines from becoming entangled with one another.

As the net is pulled in and it becomes necessary to narrow the bight, either or both of the leading lines are slackened or allowed to run out to a sufficient extent to allow the hauling lines to pull the ends of the net laterally inward or toward the engine, thus changing the direction of the hauling lines and narrowing the bight. The leading lines can be separately or together fleeted to the different posts and the hauling be still controlled according to the situation of the same or the place on the beach where the latter is to be landed. This is done by holding or slackening the leading lines upon either side as the case may be, or if necessary, upon both sides.

The drawings show a seine being hauled directly inward at a point opposite to the engine; but by using a series of posts, as will be readily understood, the operators are enabled to manipulate the leading lines so as to bring the net in, no matter what position it may have assumed.

The drawings show in dotted lines, two positions of a net, subsequent to the commencement of the hauling operation. In the first position the leading lines have been fleeted so as to form the net into a deep bight. In the other position, this bight has been hauled into shore, and the greater part of the net has been spread upon the beach. The great mass of fish is contained in this small bight, which is now ready to be landed and the fish removed.

In Figs. 3, and 4, I have shown the special construction which I intend to use for the snatch block through which the hauling line runs and to which the leading line is secured. At one end of the bracket 3, in which the sheave of the block is journaled, and in which the eye for the leading line is formed, is a thimble or sleeve 5, upon which is mounted a guard I, preferably a cylinder of wood. The diameter of this guard is so much greater than that of the sheave and the bracket, that, during the process of hauling or of slackening the leading lines, it keeps the sheave and its bearings out of contact with the ground or beach and thus prevents the entrance of sand and grit to said bearings. By this simple contrivance I insure the free running of the hauling lines through the blocks.

Having described my invention, what I claim is—

1. In combination, a fishing seine having hauling lines, an engine, a capstan composed of two drums mounted upon a common vertical shaft driven from the engine shaft, leading lines connected to the seine, and a series of posts or fulcrums for the leading lines set along the shore, substantially as and for the purposes set forth.

2. In combination with a seine having hauling lines and leading lines for controlling said hauling lines, an engine, a capstan operated by said engine, to which said hauling lines are carried, and posts on the shore at both sides of the engine which form fulcrums and around which the leading lines are turned, all constructed and arranged so that the leading lines can be moved to successive posts as the net is drawn in, substantially as set forth.

3. In combination with a fishing seine having hauling lines and leading lines, a block having a sheave for the hauling line, means for attaching the leading line, and a guard of greater diameter than the said sheave, substantially as and for the purpose set forth.

In testimony whereof I affix my signature, in presence of two witnesses, this 26th day of September, 1894.

ROBERT D. HUME.

Witnesses:
JAMES L. KING,
L. W. SEELY.